M. M. KAUFMANN AND J. P. LYNN.
GAME DEVICE.
APPLICATION FILED FEB. 11, 1920.
1,360,299.
Patented Nov. 30, 1920.
2 SHEETS—SHEET 1.
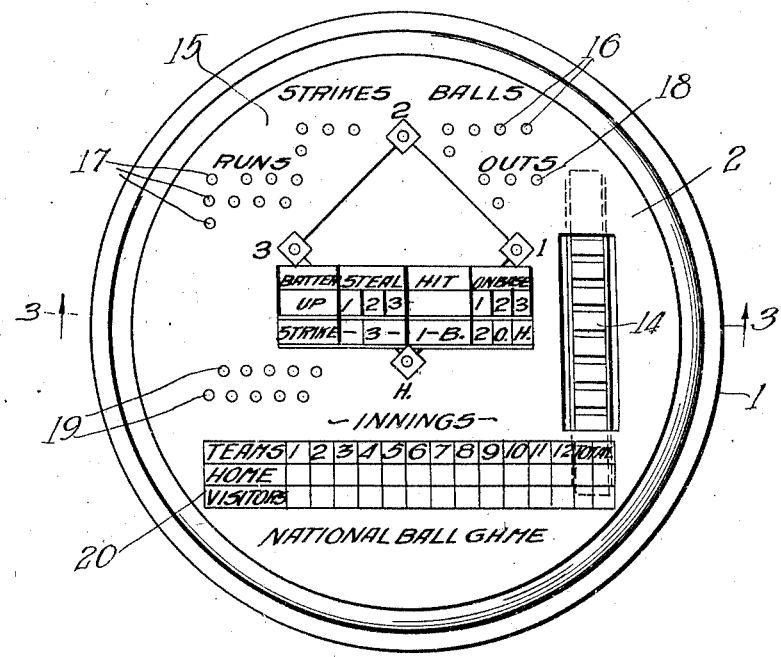
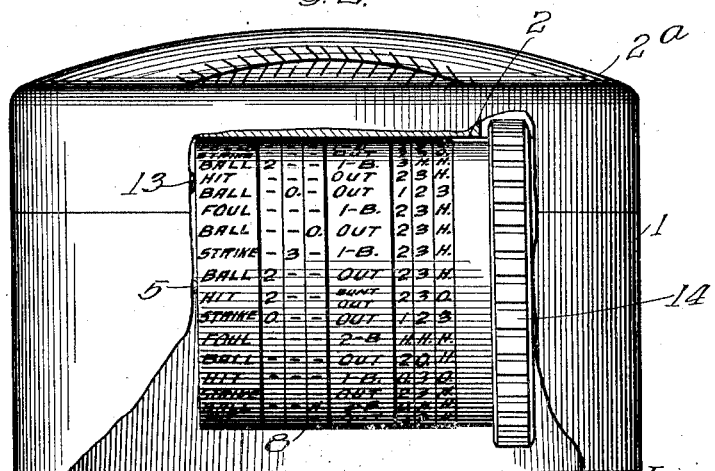

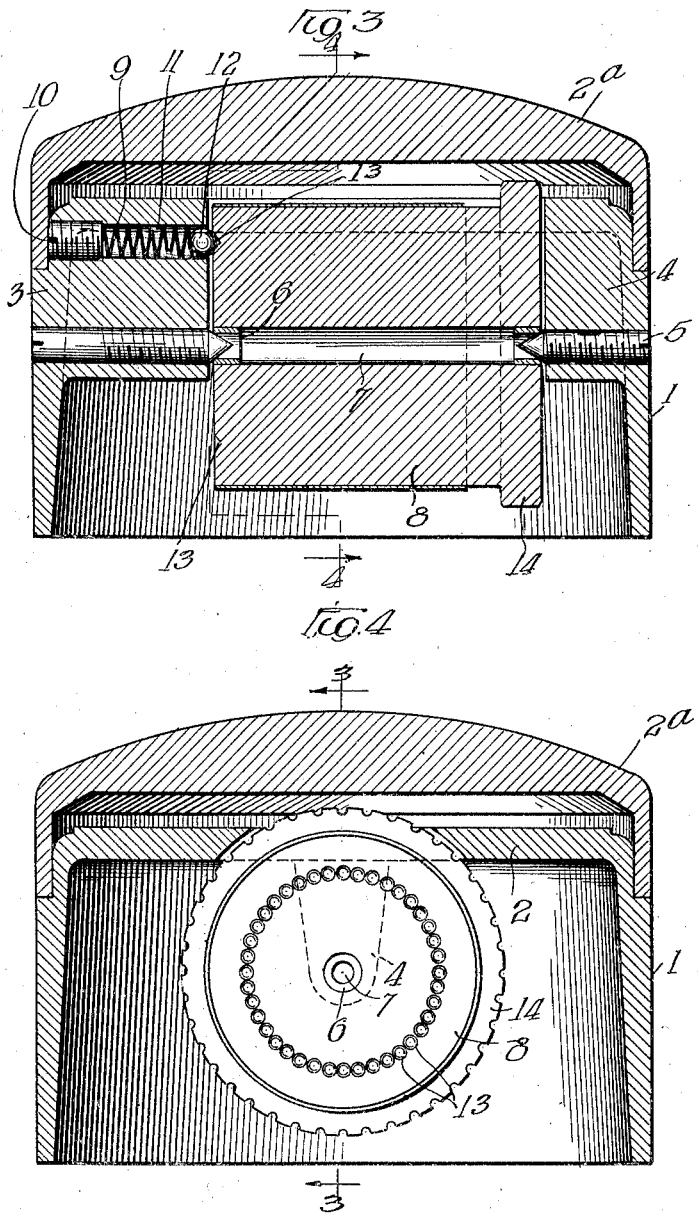

UNITED STATES PATENT OFFICE.

MICHAEL M. KAUFMANN AND JOHN P. LYNN, OF CHICAGO, ILLINOIS.

GAME DEVICE.

1,360,299.  Specification of Letters Patent.  Patented Nov. 30, 1920.

Application filed February 11, 1920. Serial No. 358,002.

*To all whom it may concern:*

Be it known that we, MICHAEL M. KAUFMANN and JOHN P. LYNN, residing at Chicago, in the county of Cook and State of Illinois, have invented certain new and useful Improvements in Game Devices, and they do hereby declare the following to be a full, clear, and exact description of the invention, such as will enable others skilled in the art to which it appertains to make and use the same.

This invention relates to improvements in game devices, and has for its particular object to provide a device of this character adapted to the playing of imaginary indoor baseball, although it may be modified to adapt it to simulate other athletic sports or games for the purpose of indoor amusement in cold weather.

The object of the invention is to provide a simple, compact device of the character aforesaid, adapted to the particular purposes mentioned.

In the accompanying drawings illustrating a suitable embodiment of the invention:

Figure —1— is a top plan view of a casing or a housing equipped with operating parts, and record-keeping means adapted to the purposes of the invention.

Fig. —2— is a side elevation of the same partially broken away to expose to view a part of the interior mechanism.

Fig. —3— is a central vertical section of the same on the line 3—3 of Fig. —4—.

Fig. —4— is a transverse section on the line 4—4 of Fig. —3—, one of the parts being shown in elevation.

Fig. —5— is a developed view of the surface of the rotatable cylinder of the device shown in Figs. —2—, —3— and —4—.

Our said device comprises a cylindrical housing 1 which is open at its lower end, and is provided with a head 2 at its upper end and with a removable cover 2ª, the upper wall of the casing being flat. Preferably this housing is molded of a suitable material and is provided internally with two diametrically opposed projections 3 and 4, the inner opposed faces of which are parallel with each other. In each of said projections a set screw 5 is mounted in opposite axially alined threaded openings extending from the outer or circumferential wall of the housing through said projections 3 and 4, the inner ends of said set screws being conical and adapted to engage in the central openings in short sleeves 6 mounted in opposite ends of the central opening 7 of a cylinder 8 which is thus rotatable on the inner ends of said screws 5 as bearings. The opposite ends of the cylinder 8 oppose the respective opposed walls of the projections 3 and 4 of the housing.

In the projection 3 there is also provided an opening 9 which is parallel with the opening or bore for the set screw 5 thereof, and in the outer end of said opening 9 there is threaded a set screw 10 which bears upon one end of a light helical compression spring 11, which at its other end bears on a small sphere 12 which constitutes a spring dog adapted to engage in a circular series of concave recesses 13 in the end of the cylinder 8 opposing said projection 3. At its other end said cylinder is provided with an annular knurled flange 14 by means of which it may be rotated in a well-known manner. The cylinder is preferably made of a solid mass of relatively heavy material so that when it is rotated it will attain and maintain considerable momentum to overcome the resistance to rotation thereof offered by the spring dog.

In the head 2 of the cylinder there is provided a longitudinal slot through which the uppermost portion of the cylinder projects slightly, said slot being increased in width to receive the flange 14 of the cylinder, the latter projecting farther above the surface of the head 2 than the body of said cylinder. The width of the slot is such as to expose several rows of printed legends mounted on the cylinder, and which is shown in Figs. —2— and —5—, and in part in Fig. —1—. The printed legends on the cylinder are disposed in horizontal rows and the recesses in the end of the cylinder in which the spring dog engages must correspond in number and location with the rows of legends on the cylinder so that the latter will, when the cylinder stops, become disposed in register with printed legends bordering the slot in the cylinder head and in connection with which they are adapted to be read.

In the upper surface of the head 2 of the cylinder, and contiguous to its periphery, there is provided two rows of recesses 15 and 16 adapted to receive pegs, and which are bordered by the printed legends to indicate certain features of the play which would occur in the game as played on the field. Adjacent to, and parallel with, said rows 15 and 16 of recesses are further rows 17 and 18 of similar recesses, also adapted to receive pegs and by means of which count is kept of the results of a game. The facsimile of a baseball diamond, such as is found on the baseball field, is preferably represented on the outer or upper face of the head 2, and this preferably is intersected by the longitudinal slot through which a part of the cylinder surface is visible. Between the said slot and the diametrically opposite portion of the periphery of said head, at which the rows of recesses 15, 16 and 17 appear, there are further parallel rows of similar recesses 19, and what may be termed the representation of a score card 20 having a plurality of spaces for the writing in pencil, or by other erasable means, the score of the game.

Mounted on the cylinder there is a printed strip of paper having four rows of words and figures respectively, printed thereon indicative of occurrences in the game by means of which, as the cylinder is rotated and comes to a stop, the score is made up and kept, the details of the particular manner of playing the game being deemed unnecessary of particular description. The game is played by opposing parties, each of whom is privileged to rotate the cylinder throughout a period of time called an "inning" and until three imaginary players have been put "out" whereupon the other party has an "inning," the scores of the respective parties being made up and kept in substantially the same way as regular baseball scores by the means provided on the head 2 above described.

We claim as our invention:

1. A game device for the purpose specified including a hollow casing open at its lower end and having a slot in its top wall, a cylinder bearing printed legends rotatable on its axis in said housing and projecting at its uppermost portion through said slot, a knurled annular flange at one end of said cylinder for digitally rotating the same projecting through an extension of said slot, the latter bordered by printed legends adapted to be read in conjunction with those on the cylinder, there being a plurality of recesses in one end of the cylinder, and a spring dog mounted in the housing for engaging in said recesses, said dog constituting a brake to resist free rotation of said cylinder and adapted to cause the same to stop so that sets of printed legends bordering said slot and carried by the cylinder will register with each other, the number and relative location of said recesses corresponding with the sets of legends on the cylinder.

2. A game device for the purpose specified including a hollow casing open at its lower end and having a slot in its top wall, a cylinder bearing printed legends rotatable on its axis in said housing and projecting at its uppermost portion through said slot, a knurled annular flange at one end of said cylinder for digitally rotating the same projecting through an extension of said slot, the latter bordered by printed legends adapted to be read in conjunction with those on the cylinder, and coacting means on the cylinder and housing for resisting free rotation of the former and causing it to stop in such position that sets of legends thereon will register with sets of legends bordering the said slot.

3. A game device for the purpose set forth including a hollow casing open at its lower end and provided in its upper wall with a slot, there being legends bordering said slots and there being a plurality of sets of recesses in said upper wall adapted to receive pegs and bordered by printed legends for the purpose set forth, a horizontally disposed cylinder rotatable on its own axis within said casing and having its uppermost surface portion projecting through said slot, means on said cylinder adapted to be digitally engaged to effect forced rotation thereof, there being a plurality of sets of printed legends on the circumferential face of said cylinder adapted to register and be read in connection with the legends bordering said slot, and coacting means on the cylinder and casing for resisting free rotation of said cylinder and effecting stoppage thereof in positions wherein the printed legends thereon will register with those bordering said slot.

Signed at city of Chicago, State of Illinois, this 14th day of January, 1920.

MICHAEL M. KAUFMANN.
JOHN P. LYNN.

Witness:
M. M. BOYLE.